(12) United States Patent
Gross

(10) Patent No.: US 10,542,800 B2
(45) Date of Patent: Jan. 28, 2020

(54) CRYPTOCURRENCY COLLECTABLES

(71) Applicant: Avrey Gross, Boulder, CO (US)

(72) Inventor: Avrey Gross, Boulder, CO (US)

( * ) Notice: Subject to any disclaimer, the term of this patent is extended or adjusted under 35 U.S.C. 154(b) by 396 days.

(21) Appl. No.: 14/571,251

(22) Filed: Dec. 15, 2014

(65) Prior Publication Data

US 2015/0164192 A1    Jun. 18, 2015

Related U.S. Application Data

(60) Provisional application No. 61/915,536, filed on Dec. 13, 2013.

(51) Int. Cl.
*A45C 1/12* (2006.01)
*G06Q 20/06* (2012.01)
*G06Q 20/38* (2012.01)

(52) U.S. Cl.
CPC .............. *A45C 1/12* (2013.01); *G06Q 20/065* (2013.01); *G06Q 20/3829* (2013.01)

(58) Field of Classification Search
CPC .. A45C 1/12; A45C 11/16; G07F 1/06; G06Q 20/3829; G06Q 20/065; G06Q 2220/00; A63H 3/005; B65D 55/02
USPC ....... 232/1 D, 4 R; 446/8; 206/815, 1.5, 6.1; 194/350; 380/277; 705/69, 71
See application file for complete search history.

(56) References Cited

U.S. PATENT DOCUMENTS

| | | | | |
|---|---|---|---|---|
| 182,826 A * | 10/1876 | Hoard | ...................... | A45C 1/12 206/815 |
| 2,218,431 A * | 10/1940 | McGee | ...................... | A45C 1/12 232/4 R |
| 2,420,125 A * | 5/1947 | Crist | ...................... | A47G 29/10 206/1.5 |
| 3,610,177 A * | 10/1971 | Shapiro | ...................... | E05G 1/024 109/50 |
| 4,126,267 A * | 11/1978 | Emmie | ...................... | A45C 1/12 232/4 R |
| 4,275,810 A * | 6/1981 | Waldmeier | ............. | A45C 11/16 206/459.5 |
| 4,286,526 A * | 9/1981 | Rabelos | ................... | A45C 1/12 109/24 |
| 4,493,433 A * | 1/1985 | Sideri | ................... | B65D 11/10 206/1.5 |
| 4,602,712 A * | 7/1986 | Williams | ............. | A45C 11/182 206/815 |
| 4,699,313 A * | 10/1987 | Sander | ..................... | A45C 1/12 232/4 R |

(Continued)

FOREIGN PATENT DOCUMENTS

JP    54156600 A  * 12/1979

*Primary Examiner* — William L Miller
(74) *Attorney, Agent, or Firm* — Will Hunziker

(57) ABSTRACT

A collectable object with a sealed cavity that contains a private key that grants the user access to cryptocurrency saved to an account when the cavity of the sealed object is visibly broken into in order to gain access to the cavity. The object may also have: a record of the date on which the cryptocurrency was deposited in the account; a record of the amount of cryptocurrency in the account; a record of the amount of cryptocurrency in the account in relation to one or more currencies on the date the cryptocurrency was deposited in the account; instructions for use of the private and/or public key and account; and a public key which allows the user to view the amount of cryptocurrency deposited in the account.

14 Claims, 1 Drawing Sheet

(56) References Cited

U.S. PATENT DOCUMENTS

| | | | | |
|---|---|---|---|---|
| 5,716,211 | A | * | 2/1998 | Vetter .................... G09B 19/18 434/107 |
| 6,825,753 | B2 | * | 11/2004 | Cardinale ............. E05B 43/005 340/5.73 |
| 7,347,356 | B2 | * | 3/2008 | Fields ...................... A45C 1/02 206/81 |
| 8,789,745 | B1 | * | 7/2014 | Barbary .................. A45C 1/12 232/4 R |
| 8,977,234 | B2 | * | 3/2015 | Chava ................ G06Q 20/3276 340/12.5 |
| 2002/0157437 | A1 | * | 10/2002 | Laurie ..................... A45C 1/12 70/272 |
| 2008/0108272 | A1 | * | 5/2008 | Lin .......................... G07D 3/16 446/8 |
| 2008/0233829 | A1 | * | 9/2008 | Sayles ...................... A45C 1/12 446/8 |
| 2013/0166455 | A1 | * | 6/2013 | Feigelson ............. H04L 9/3234 705/64 |
| 2015/0046337 | A1 | * | 2/2015 | Hu ..................... G06Q 20/0658 705/65 |
| 2015/0227897 | A1 | * | 8/2015 | Loera .................. G06Q 20/065 347/5 |
| 2015/0324789 | A1 | * | 11/2015 | Dvorak ............. G06Q 20/3823 705/67 |
| 2016/0140653 | A1 | * | 5/2016 | McKenzie ............. G06Q 40/02 705/69 |

\* cited by examiner

CRYPTOCURRENCY COLLECTABLES

CROSS REFERENCE TO RELATED APPLICATIONS

This application claims the benefit of U.S. Provisional Patent Application No. 61/915,536, filed on Dec. 13, 2013, which is incorporated by reference herein in its entirety for all purposes.

BACKGROUND OF THE INVENTION

1. Field of the Invention

The present invention pertains to the field of storing cryptocurrency in a collectable sealed object.

2. Description of Related Art

The closest related invention is a piggy bank. Piggy banks are typically made of ceramic or porcelain. They are generally painted and serve as a pedagogical device to teach the rudiments of thrift and savings to children; money can be easily inserted and removed. Many piggy banks have a rubber plug located on the underside; others are made of vinyl and have a removable nose for easy coin access. Many are not shaped like a pig and some incorporate electronic systems that calculate the amount of money deposited. Books, film, and other dramas often portray piggy banks that have no opening besides the slot for inserting. A character is shown smashing the ceramic bank. It shows how earnest the character is, that they are willing to destroy the bank forever to use the funds.

As a method of retaining fiat money and educating consumers about the rudiments of thrift and saving the piggy bank suffers from few major flaws. Fiat money typically suffers from inflation and the value of that money becomes less over time than when it was first deposited; thus, a dollar saved today will only be worth less than a dollar when it is retrieved. There is no indication of when the funds are deposited, or their current value in relation to when they where deposited. Additionally, there is no way of easily determining the amount of money present in a piggy bank by looking at the piggy bank unless there is some sort of digital display.

The second field of art the current invention relates to is cryptocurrency. Cryptocurrency is a digital medium of exchange. The first cryptocurrency to gain significant market share in trading was Bitcoin in 2009, since then numerous cryptocurrencies have become available. Cryptocurrencies are at bottom specifications regarding the use of currency that seek to incorporate principles of cryptography to implement a distributed, decentralized, and secure information economy. When comparing cryptocurrencies to fiat money, the most notable difference is in how no group or individual may gain any significant control over the production of money, instead only a certain amount of cryptocurrency can possibly be produced by the entire cryptocurrency system collectively, at a rate which is always both prior defined and publicly known.

Currently there are coins that have stickers on the sides of them that display the number of Bitcoins in an account revealed on the inside of the sticker. These coins are not a safe vessel for the storage of Bitcoins as the sticker can easily be removed and in some cases the Bitcoins can be transferred and the sticker re-applied to the coin. There are no products on the market that combine the physical characteristics of a piggybank like object with the storage of Bitcoins.

SUMMARY

The scope of the present invention is defined solely by the appended claims and detailed description of a preferred embodiment, and is not affected to any degree by the statements within this summary. In addressing many of the problems experienced in the related art the present disclosure generally involves collectable objects for the storage and display of cryptocurrency.

Embodiments of the present invention detail a product for storing a private key inside a sealed object that may be of any shape or material. The private key allows the user exclusive access to and control of a cryptocurrency deposited in an account. The private key may be secured inside the sealed object and may be printed, preserved, physically rendered on the object or a separate object within the sealed object, or digitally encoded in a media within the object in such a way that it is not viewable until the sealed object is opened. Either inside or outside of the sealed object, there may also be one or more of the following: (1), a record of the date on which the money or cryptocurrency was deposited in the account; (2), a record of the amount of money or cryptocurrency in the account; (3), a record of the amount of money or cryptocurrency in the account in relation to one or more currencies on the date the money or cryptocurrency was deposited in the account; (4), instructions for use of the private and/or public key and account; and/or (5), a public key which allows the user to view the amount of money or cryptocurrency deposited in the account.

Embodiments of the present invention comprise a sealed object containing a private key to a cryptocurrency account that is only accessible by breaking or permanently altering the sealed object or the object's seal.

Embodiments of the present invention comprise sealed objects that are made in collectable limited series; such series may be named, dated, and include the number of objects in the series along with an object number.

Embodiments of the present invention may comprise sealed objects such as: figurines, ornaments, decorations, adornments, glass pieces, sculptures, statuettes, porcelains, breakables, ceramics, potteries and the like.

Embodiments of the present invention may comprise sealed objects that are promotional objects for companies, artists, and cryptocurrencies that may be themselves; or feature on them: logos, trademarks, signage, slogans, or other identifying information.

OBJECTS AND ADVANTAGES

The present disclosure can provide a number of advantages depending on the particular aspect, embodiment, and/or configuration. None of the particular objects or advantages that follow must be entirely satisfied as they are non-exclusive alternatives and at least one of the following objects is met; accordingly, several objects and advantages of the present invention are:

(a) to provide a sealed object for securely storing a cryptocurrency private key;

(b) to provide a sealed object for securely storing a cryptocurrency private key that is only accessible by breaking or permanently altering the sealed object or the object's seal;

(c) to provide a sealed object for securely storing a cryptocurrency private key that is one of a collectable limited series; such series may be named, dated, and include the number of objects in the series along with an object number;

(d) to provide a sealed object for securely storing a cryptocurrency private key with a record of the date on which cryptocurrency was deposited in the account linked to the private key;

(e) to provide a sealed object for securely storing a cryptocurrency private key with a record of the amount of cryptocurrency in the account linked to the private key;

(f) to provide a sealed object for securely storing a cryptocurrency private key with a record of the amount of virtual currency in the account in relation to one or more currencies on the date the cryptocurrency was deposited in the account linked to the private key;

(g) to provide a sealed object for securely storing a cryptocurrency private key with instructions for use of a private and/or public key;

(h) to provide a sealed object for securely storing a cryptocurrency private key with a public key that allows the user to view the amount of cryptocurrency deposited in the account linked to the private key;

(i) to provide a sealed object for securely storing a cryptocurrency private key wherein the private key is inside a sealed object and the private key is only accessible by breaking or permanently altering the sealed object or the object's seal;

(j) to provide a sealed object for securely storing a cryptocurrency private key comprising sealed objects such as: figurines, ornaments, decorations, adornments, glass pieces, sculptures, statuettes, porcelains, breakables, ceramics, potteries and the like; and (k) to provide a sealed object for securely storing a cryptocurrency private key comprising sealed objects that are promotional objects for companies, artists, and cryptocurrencies that may be themselves; or feature on them: logos, trademarks, signage, slogans, or other identifying information.

These and other objectives and advantages of the instant invention will become apparent from the following description taken in conjunction with the accompanying drawings wherein are set forth, by way of illustration and example, certain embodiments of the instant invention. The drawings are intended to constitute a part of this specification and include exemplary embodiments of the present invention and illustrate various objects and features thereof.

BRIEF DESCRIPTION OF THE DRAWINGS

The above, and other, aspects, features, and advantages of several embodiments of the present disclosure will be more apparent from the following Detailed Description as presented in conjunction with the following several figures of the Drawings.

Figures

Figure 1:
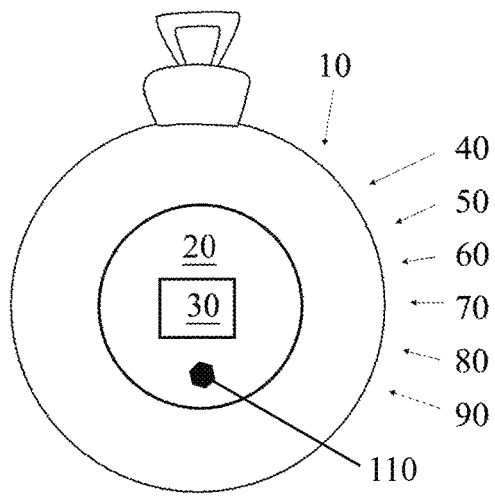
FIG. 1 (Sheet 1) illustrates a perspective view of a sealed object, in accordance with an embodiment of the present disclosure.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

REFERENCES

10 A sealed object
12 A glass Christmas ornament
14 A ceramic dog figurine with a removable head
16 A plastic dog toy
18 A squirrel stuffed animal
20 A sealed cavity
30 A private key
40 A record of the date on which the money or cryptocurrency was deposited in the account
50 A record of the amount of money or cryptocurrency in the account
60 A record of the amount of money or cryptocurrency in the account in relation to one or more currencies on the date the money or cryptocurrency was deposited in the account
70 Instructions for use of the private and/or public key and account
80 A public key that allows the user to view the amount of money or cryptocurrency deposited in the account
90 A series name, date, number of objects in the series, and number that the sealed object is in the series
    100 Promotion for another company
    110 Precious metals or stones

DETAILED DESCRIPTION

The following description is not to be taken in a limiting sense, but is made merely for the purpose of describing the general principles of exemplary embodiments, many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

For the purposes of promoting an understanding of the principles of the present invention, reference will now be made to the embodiments illustrated in the drawings and specific language will be used to describe the same.

Definitions

Cryptocurrency: for the purposes of this patent, cryptocurrency may also mean digital currency, electronic money, virtual currency, or any alternative currency not produced by a government endorsed central bank or necessarily backed by a national currency.

Public key cryptography: public key cryptography, also known as asymmetric cryptography, refers to one or more cryptographic algorithms which require two or more separate keys, one of which is secret (or private) and one of which is public. Although different, the two parts of this key pair are mathematically linked. The public key may be used to encrypt plaintext or to verify a digital signature; whereas the private key may be used to decrypt ciphertext or to create a digital signature.

Public key: for the purposes of this patent, a public key is a cryptographic key in a system using a public key cryptography. The public key can be shared openly without fear that anyone can gain access to the information encrypted by the public key cryptography. The public key can be used as an "address" to which other users can send cryptocurrency.

Private key: for the purposes of this patent, a private key is a cryptographic key in a system using a public key cryptography. The private key, when used in conjunction with the public key, allows the user to access to the information encrypted by the public key cryptography. The private key allows a user to access and control sending cryptocurrency or standard money from and account.

Account: for the purposes of this patent, an account may be a bank account, or a collection of one or more public key "addresses", to which other users may send cryptocurrency or standard money. An account may also be what is often referred to as a "wallet".

Cryptocurrency Collectables

Embodiments of the present invention detail a product for storing a private key in a sealed object that may be of any shape or material. The private key allows the user exclusive access to and control of a cryptocurrency or regular currency deposited in an account. The private key may be secured inside the sealed object and may be printed; preserved; physically rendered on the object, or a separate object within the sealed object; or digitally encoded in a media within the object in such a way that it is not viewable until the sealed object or the separate object within the sealed object or digitally encoded media is opened.

FIG. 1 illustrates a perspective view of a sealed object (10); in this embodiment it is a glass Christmas ornament (12). In other embodiments the sealed object may be any small collectable object, such as, but not limited to: figurines; toys; stuffed animals; ornaments; glass, ceramic, or plastic works; small sculptures or statues; key chains; promotional items; etc. Such sealed object may be made out of any material suitable to its purpose. The sealed object has a cavity (20) inside of it that may be sealed in such a way that in order for the user to access the cavity (20) the user must destroy or permanently alter the sealed object in some way that is visual and apparent.

Still referring to FIG. 1, inside of the cavity (20) of the sealed object (10) there is a private key (30). The private key (30) may be a series of words, numbers, or an image such as a quick response (QR) code, or digital information on digital media. The private key (30) may be on a separate object that is removable from the sealed object (10), it may be imbedded in the sealed object such that it cannot be removed, or it may be another sealed object that the user must destroy or permanently alter in some way that is visual and apparent in order to get access to the private key (30).

Once the user has accessed the cavity (20) of the sealed object (10) the user may then use the private key (30) contained therein. The private key (30) contained in the sealed object (10) should be the only representation of that private key in order to secure usage, if desired, of the private key to the user who accesses the private key by opening the sealed object. The private key then allows the user to access and control money or cryptocurrency held in an account or wallet. The object (10) with the sealed cavity (20) would be sold with money or cryptocurrency already deposited in the account. One preferred embodiment uses a Bitcoin private key to gain access and control of Bitcoin cryptocurrency in a Bitcoin wallet.

Figure 2:
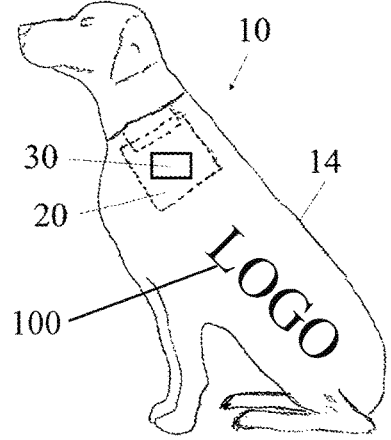
FIG. 2 (Sheet 1) illustrates perspective view of a sealed figurine with removable top, in accordance with an embodiment of the present disclosure.
Figure 3:
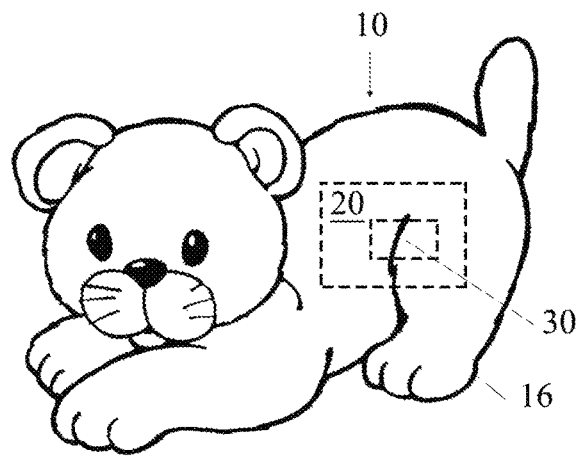
FIG. 3 (Sheet 1) illustrates a perspective view of a sealed figurine, in accordance with an embodiment of the present disclosure.
Figure 4:
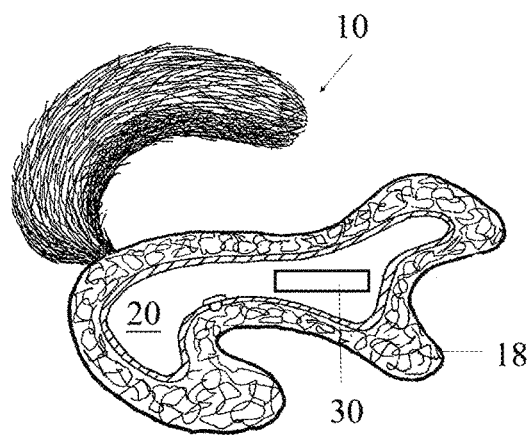
FIG. 4 (Sheet 1) illustrates a perspective view of a sealed stuffed animal, in accordance with an embodiment of the present disclosure.

FIGS. 2, 3, and 4, illustrate additional embodiments of the object (10) with a sealed cavity (20). In FIG. 2 the sealed object is a ceramic dog figurine (14) with a removable head; in FIG. 3 the sealed object is a plastic toy dog (16); and in FIG. 4 the sealed object is a squirrel stuffed animal. These embodiments of the object with a sealed cavity are not meant to be exhaustive, but merely illustrative of some preferred embodiments made in: glass, ceramics, plastic, and textiles. All the illustrated embodiments are small; this is because the sealed objects are meant to be collectable and displayed either as toys or works of art that can be hung or arranged next to each other. The sealed objects may be handcrafted to further increase their unique nature and collectability. The collectable nature of the objects also diminishes the likelihood of their being opened in order to access the private key sealed within.

To further the collectable nature of the objects with the sealed cavities and provide a provenance for the object either the inside or outside, or both, of the sealed object (10) may comprise one or more of the following: (1), a record of the date on which the money or cryptocurrency was deposited in the account (40); (2), a record of the amount of money or cryptocurrency in the account (50); (3), a record of the amount of money or cryptocurrency in the account in relation to one or more currencies on the date the money or cryptocurrency was deposited in the account (60); (4), instructions for use of the private and/or public key and account (70); and/or (5), a public key which allows the user to view the amount of money or cryptocurrency deposited in the account (80). These pieces of information are useful for determining the value of the money or cryptocurrency within the sealed object, using the money or cryptocurrency in the cavity sealed object, and as an aid in educating the user or owner of the object about cryptocurrency and/or investment.

Embodiments of the present invention may also comprise objects with a sealed cavity that are made in collectable limited series; such series may be named, dated, and include the number of objects in the series along with an object number for which number that sealed object is in the series (90).

Embodiments of the present invention may also comprise objects with a sealed cavity that are promotional objects for companies (100), artists, cryptocurrencies or other purposes. Additional embodiments of the invention may store other valuables in the sealed object such as precious metals or stones (110).

Embodiments of the present invention may also comprise objects with a sealed cavity that are promotional objects for companies, artists, cryptocurrencies or other purposes. Additional embodiments of the invention may store other valuables in the sealed object such as precious metals or stones.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. An object comprising:
    a sealed internal cavity, wherein said sealed internal cavity not in communication with an exterior of the object is only accessible by visibly breaking said object; and
    a private cryptocurrency key inside said sealed internal cavity, wherein said private cryptocurrency key allows access to and withdrawal of cryptocurrency from a cryptocurrency account.

2. The object of claim 1, further comprising a public cryptocurrency key located either in said internal cavity or on the exterior of said object.

3. The object of claim 1, further comprising a record of the amount of cryptocurrency in said cryptocurrency account located either in said internal cavity or on the exterior of said object.

4. The object of claim 1, further comprising a record of the date on which the cryptocurrency was deposited in said cryptocurrency account located either in said internal cavity or on the exterior of said object.

5. The object of claim 1, further comprising a record of the amount of cryptocurrency in said cryptocurrency account in relation to one or more currencies on the date the cryptocurrency was deposited in said account located either in said internal cavity or on the exterior of said object.

6. The object of claim 1, further comprising instructions for use of said private cryptocurrency key or a public cryptocurrency key with said cryptocurrency account located either in said internal cavity or on the exterior of said object.

7. The object of claim 1, further comprising a record of the number of identical objects manufactured in a series along with an object number for which number that object is in the series located either in said internal cavity or on the exterior of said object.

8. The object of claim 1, wherein the object comprises an object that promotes another company located either in said internal cavity or on the exterior of said object.

9. The object of claim 1, further comprising precious metals or stones located either in said internal cavity or on the exterior of said object.

10. The object of claim 1, wherein the object is made of plastic.

11. The object of claim 1, wherein the object is a figurine.

12. The object of claim 1, wherein the object is a hanging ornament.

13. The object of claim 1, wherein the object is anthropomorphic.

14. An object comprising:
    a sealed internal cavity not in communication with an exterior of the object, wherein said sealed internal cavity is only accessible by visibly breaking said object;
    a private cryptocurrency key inside said sealed internal cavity, wherein said private cryptocurrency key allows access to and withdrawal of cryptocurrency from a cryptocurrency account;
    a public cryptocurrency key located either in said internal cavity or on the exterior of said object;
    a record of the amount of cryptocurrency in said cryptocurrency account located either in said internal cavity or on the exterior of said object;
    a record of the date on which the cryptocurrency was deposited in said cryptocurrency account located either in said internal cavity or on the exterior of said object; and a record of the amount of cryptocurrency in said cryptocurrency account in relation to one or more currencies on the date the cryptocurrency was deposited in said cryptocurrency account located either in said internal cavity or on the exterior of said object.

\* \* \* \* \*